2 Sheets—Sheet 2.
G. L. SHELDON.
TRUCK FOR PULLING STONES.
No. 48,315.
Patented June 20, 1865.
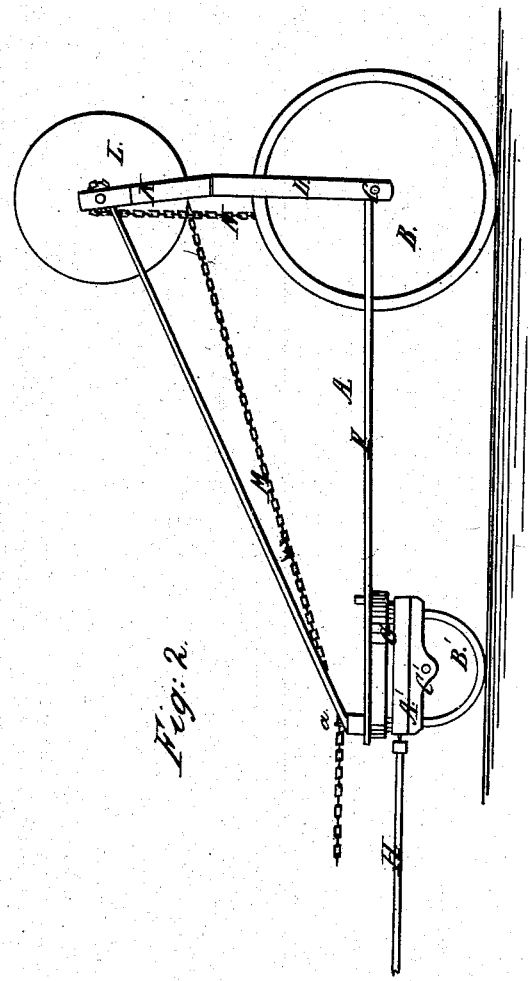
Witnesses.
M A Hearne Jr.
J M Covington.
Inventor.
G L Sheldon.
By Munn & Co
Attys.

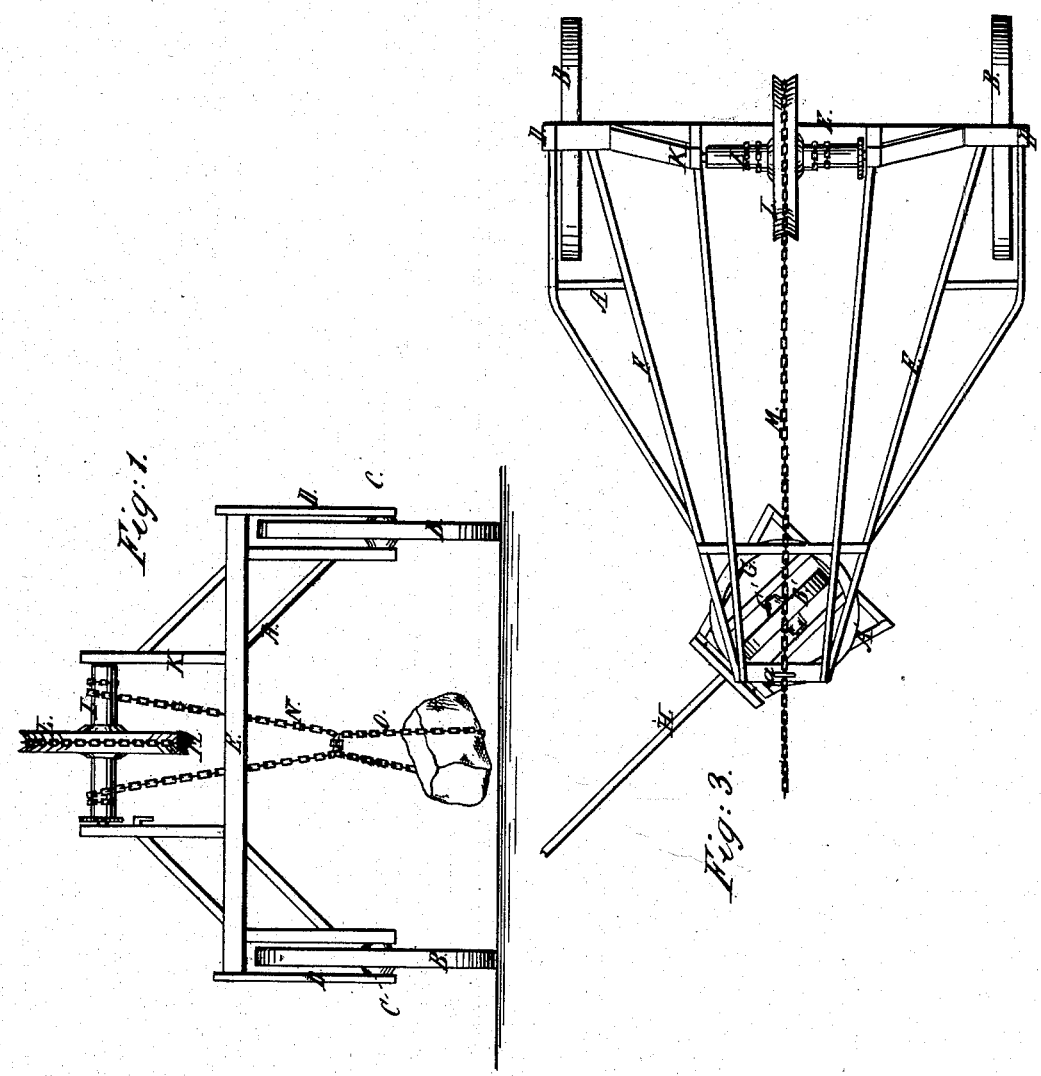

UNITED STATES PATENT OFFICE.

GILBERT L. SHELDON, OF HARTSVILLE, MASSACHUSETTS.

IMPROVEMENT IN TRUCKS FOR PULLING STONES.

Specification forming part of Letters Patent No. 48,315, dated June 20, 1865.

*To all whom it may concern:*

Be it known that I, GILBERT L. SHELDON, of Hartsville, in the county of Berkshire and State of Massachusetts, have invented a new and Improved Truck for Pulling Stones, &c.; and I do hereby declare that the following is a full, clear, and exact description thereof, which will enable others skilled in the art to make and use the same, reference being had to the accompanying drawings, forming a part of this specification, in which—

Figure 1 represents an end view of this invention. Fig. 2 is a side elevation of the same. Fig. 3 is a plan or top view of the same.

Similar letters of reference indicate like parts.

This invention relates to certain improvements in that class of machines for pulling stones, &c., on which Letters Patent have been granted to me September 8, 1863.

The present invention consists in the combination, with the frame which forms the bearings for the windlass, of a truck supported by two hind and one or more front wheels in such a manner that when the team is detached from the draft-pole it can be hitched to the drag-chain without requiring any time for supporting or securing the truck, and the snatch-block can also be dispensed with.

A represents a truck, which is supported by two wheels, B, behind and one or more wheels, B', in front. The hind wheels run on separate axles, C, which have their bearings in standards D, that rise up and support the single bar E. From the lower ends of the standards D extend beams F to the front end of the truck A. This front end of the truck A rests upon the wheel B', which is mounted on the axle C', that has its bearings in a secondary truck, A', and the secondary truck is connected to the main truck by the fifth-wheel G, as clearly shown in Figs. 2 and 3 of the drawings. From the secondary truck A' extends the draft-pole H, and by means of the fifth-wheel G and secondary truck A' the fore wheel and draft-pole can be turned in either direction, as shown in Fig. 3.

The frame K, which forms the bearings for the windlass I, is supported by the single bar E, and in the center of the windlass is mounted the sheave L, on which the drag-chain M is wound. This drag-chain extends through a loop, *a*, secured in the front cross-bar of the main truck A; or, instead of this loop, a small pulley may be applied. The chain N, which serves to pull the stone, stump, or other article, is secured at both ends to the windlass I, one end on either side of the sheave L, and its ends are wound in opposite directions to the drag-chain M.

The stone or other article to be pulled is secured to the chain N by means of a second chain, O, as shown in Fig. 1, or in any other suitable manner, or the chain N may be secured directly to said stone or other article, and then the draft-animals are detached from the draft-pole, which is turned out laterally, as shown in Fig. 3, and by attaching the animals to the drag-chain M a considerable purchase is obtained, whereby a stone, stump, or other article can be pulled from the ground with great force. After having raised the stone or other article to the requisite height above the ground, the windlass is stopped by a pawl and ratchet-wheel or any other suitable mechanism, and by hitching the draft-animals to the pole H the truck, together with the stone or other article, can be conveniently carried to any place where said stone or other article is to be dumped.

By the attachment of the fore wheel, B', to the truck the operation of raising and carrying off the stone or other article is greatly simplified, no time is lost in adjusting and supporting the truck, and no snatch-block is needed.

Having thus described my invention, I claim as new and desire to secure by Letters Patent—

The combination of the secondary truck A' and wheel B' with the truck A, frame K, windlass I, sheave L, and chains M N, constructed and operating substantially as and for the purpose described.

GILBERT L. SHELDON.

Witnesses:
H. S. UNDERWOOD,
W. C. UNDERWOOD.